United States Patent [19]

Long

[11] 3,825,696

[45] July 23, 1974

[54] DIGITAL DATA INTERFACE SYSTEM

[75] Inventor: Robert G. Long, Scarborough, Ontario, Canada

[73] Assignee: D.D.I. Communications, Inc., Lewiston, N.Y.

[22] Filed: Feb. 20, 1973

[21] Appl. No.: 333,487

[52] U.S. Cl. ............................ 179/15 A, 340/172.5

[51] Int. Cl. ............................ H04j 1/00

[58] Field of Search ......... 179/15 A, 15 BA, 15 BV, 179/18 FF; 340/413, 172.5

[56] References Cited

UNITED STATES PATENTS

| | | | |
|---|---|---|---|
| 3,245,066 | 4/1966 | Mattlet | 340/413 |
| 3,618,082 | 11/1971 | Feulner | 340/413 |
| 3,692,944 | 9/1972 | Durteste et al. | 179/18 FF |
| 3,715,515 | 2/1973 | Stirling et al. | 179/15 R |
| 3,723,658 | 3/1973 | Huebner et al. | 179/15 R |

*Primary Examiner*—Raulfe B. Zache
*Assistant Examiner*—Michael Sachs
*Attorney, Agent, or Firm*—Woodling, Krost, Granger & Rust

[57] ABSTRACT

An interface system is disclosed for digital data with the data appearing on a transmitter assembly as plural bits defining individual digitized words in a sentence. One or more words is established on each of a plurality of transmitter extenders and each transmitter extender is scanned in sequence by clock pulses to determine simultaneously the status of all bits in a word. Enabling means is provided in the transmitter assembly which develops a check advance pulse as each extender or word is being scanned. Reset means establishes reset of the scanning means upon unequal outputs from the clock pulse and from the enabling means being supplied to a comparator such as occurs at the end of the sequence of extenders. A change detector is connected on each word input means to detect a change in any of the plural bits of a digitized word. Upon detecting a change, an interrupt signal is generated. As each extender is scanned, the scan passes through the extender by actuating the enabling means if there is no change in the word. If there is a change in the word, the interrupt signal freezes the scan and establishes the status of the word on a plurality of conductors interconnecting the transmitter extenders. Address information as to the address of the changed word is produced and both the address information and status information is thus available to a computer which acknowledges the information and restarts the scanning. The foregoing abstract is merely a resume of one general application is not a complete discussion of all principles of operation or applications, and is not to be construed as a limitation on the scope of the claimed subject matter.

16 Claims, 5 Drawing Figures

DIGITAL DATA INTERFACE SYSTEM

BACKGROUND OF THE INVENTION

Digital data systems have been used to monitor a machine or a group of machines or a process, for example, to monitor the open or closed condition of a switch or the running or stopped condition of a motor, for example. This digital data is in effect a group of paralleled switches which are either open or closed and may be used to control a group of pilot lights, for example, so that a supervisor may tell at a glance the condition of the machine or process. Such digital data may be sent over a long telephone line by an extendable multiplexer such as in the copending application Ser. No. 158,362, filed June 30, 1971 now U.S. Pat. No. 3,723,658, issued Mar. 27, 1973. By such means, the supervisory panel may be at a distance from many separately located machines or processes under surveillance.

Another use for the digital data system is not only to display this machine or process status information to a sypervisor but also to supply it to a computer. Simple computers may be connected directly to receive such data with the data being up-dated constantly as the changes in the machine or process occur. With more expensive, larger and complex computers, the cost of the computer time, whether owned or leased, increases considerably. In such cases it is usually uneconomical to have the data continuously being supplied to the computer so that the computer may use this data input to control the machine or process.

Time sharing computers are available wherein the computer might share its time among a large number of input terminals devoting a fraction of a second to working on the problems of each data input terminal in sequence. However, in such case the data cannot be supplied continuously to the computer, otherwise the computer might miss some of the data input being supplied. Accordingly, an object of the invention is to provide a digital data interface system interfacing with a computer which will obviate the above disadvantages.

Another object of the invention is to provide a digital data interface system wherein data is presented to the computer at the command of a computer.

Another object of the invention is to provide a digital data interface system for a computer wherein the data may be temporarily stored and supplied upon command of a computer to be stored in a computer memory and then the computer sends a signal to allow a scanning of the data to restart.

Another object of the invention is to provide a data interface system wherein the input data is scanned in sequence and the scan is halted upon scanning a change in the input of the data until the computer receives and acknowledges the changed data.

Another object of the invention is to provide a data interface system wherein the data is scanned and if changed since the last scan the scan is halted to develop an interrupt signal which may be acknowledged by a computer with the computer receiving both the data status information and a data address information giving the address of a digitized word in a sentence.

Another object of the invention is to provide a scanning circuit which scans plural bit digitized words in a word-by-word manner; namely, simultaneously scanning all the bits in an entire word and then moving on to scan the next word.

Another object of the invention is to scan data word inputs to determine simultaneously the status of all data bits in the word.

Another object of the invention is a scanning circuit wherein data groups or words are provided on extenders which may be extended without mathematical limit.

Another object of the invention is a circuit to scan data words with a comparator resetting the circuit upon a main pulse counter and an echo pulse counter becoming out of synchronization.

SUMMARY OF THE INVENTION

The invention may be incorporated in a digital data interface system, comprising in combination, a transmitter assembly, input means to apply to said transmitter assembly a plurality of digitized words of a sentence, scanning means in said transmitter assembly, means connecting said scanning means to scan the words in sequence in said transmitter assembly, change detector means in said transmitter assembly connected to said input means to detect a change in a word, a first plurality of conductors paralleled to said transmitter assembly, and word status information means connected to establish information as to the changed word on said paralleleled conductors.

Other objects and a fuller understanding of the invention may be had by referring to the following description and claims, taken in conjunction with the accompanying drawing.

DESCRIPTION OF THE PREFERRED EMBODIMENT

Figure 1:
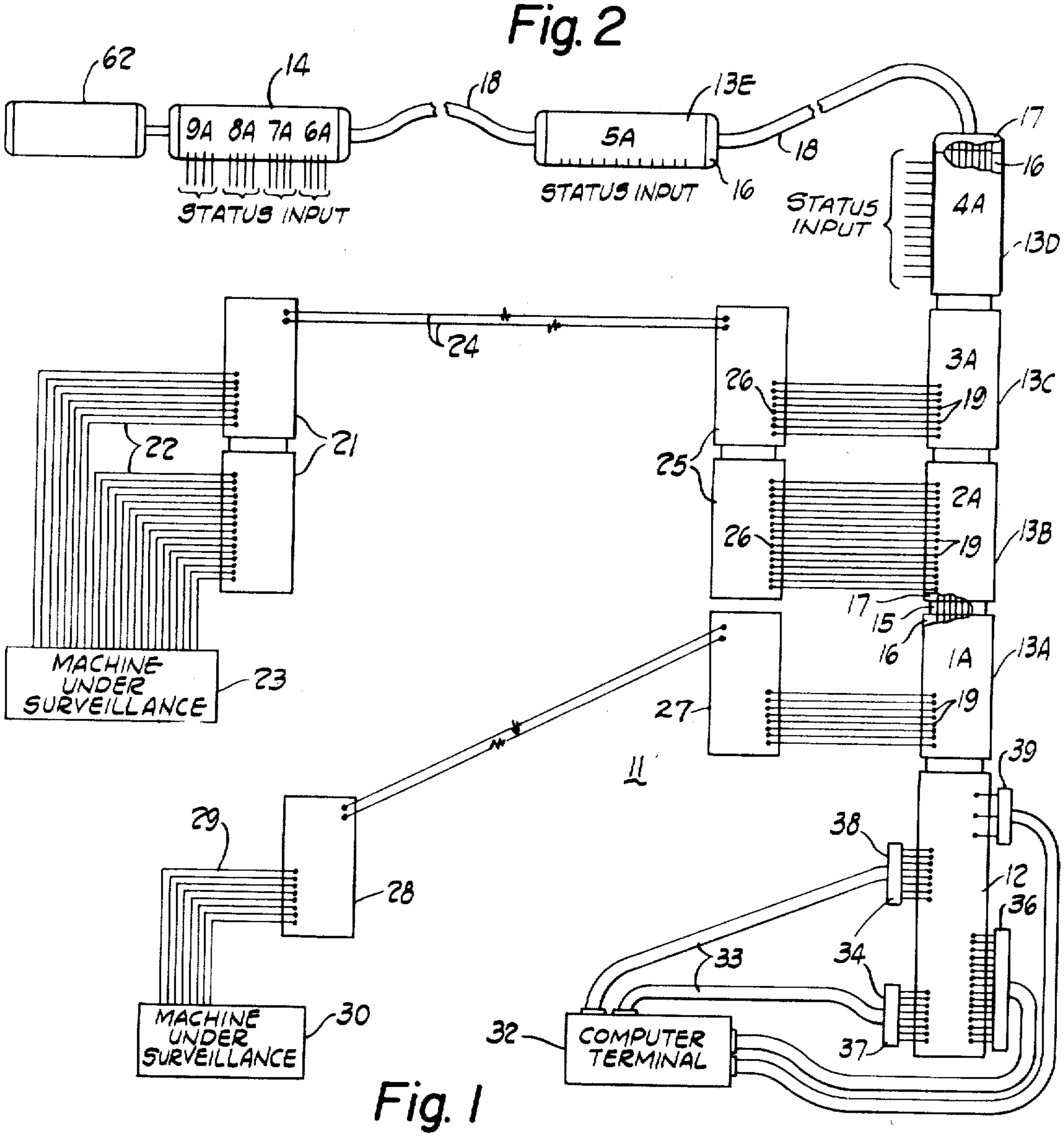
FIG. 1 is a schematic diagram of the entire digital data interface system.

FIG. 1 is a schematic diagram of a digital data computer interface system 11 which embodies the invention. This sytem 11 includes a transmitter assembly which has a computer interface transmitter 12 and a plurality of transmitter extenders 13 and 14. A first plurality of conductors 15 are paralleled to each of the transmitter extenders 13 and 14 and to the interface transmitter 12. A plug and socket means is used to interconnect the extenders and the transmitter and in the preferred embodiment a plug 16 is provided on one end of an extender and a socket 17 is provided on the other end of the extender. In such manner the extenders may be connected in sequence. Also a socket 17 may connect onto a plug 16 with this socket 17 connected to a flexible cable 18 and the other end of the cable 18 carrying a socket 16 for connection to a remotely mounted exterior 13E or 14.

Digital data is established on the transmitter extenders 13 and 14 and the transmitter 12 by any suitable means. In the preferred embodiment this digital data is established as digitized words in a sentence. By definition, one or more words is established on each extender 13 or 14. Each word is made up of a plurality of data bits with these bits applied to input terminals or two-state signalling points 19. There may be two or more bits to a word, for example, there may be four bits to the word 6A on the input terminals 19 of extender 14. Also there may be eight bits to a word 1A or 3A on the input terminal 19 of extenders 13A and 13C. Alternatively there may be 16 bits to a word 2A on input terminals 19 of extender 13B.

This digitized data may be established on the transmitter assembly in any number of ways. The extendable multiplexer of the copending application Ser. No. 158,362, filed June 30, 1971, now U.S. Pat. No. 3,723,658, may be used to establish such digitized data. Such extendable multiplexer may include a digital transmitter assembly 21 connected by conductors 22 to a process or machine 23 under surveillance. The digital transmitter assembly 21 multiplexes such digital data and sends it over a pair of conductors 24 such as a telephone line to a digital receiver assembly 25 which decodes the multiplexed signal and supplies it from output terminals 26 via individual conductors to the input terminals 19 of the transmitter extenders 13. The computer interface system 11 is quite flexible and a part of the digital data may come from a separate digital transmitter assembly 28 having input terminals connected by conductors 29 to a process or machine 30 under surveillance. This data would be transmitted by a conductor pair to a receiver 27, with output terminals connected to the input terminals 19 on word 1A. Status inputs of a similar type may be supplied to the extenders 13D and 13E. Where the status input is of words of a small number of bits, for example, four bits per word, then the extender 14 may be used wherein the input terminals are grouped into words of four bits each. The status input to these last mentioned extenders may be from any process or machine under surveillance such as machines 23 or 30.

The computer interface transmitter 12 may be connected directly to a computer or computer terminal 32 by means of flexible cables 33 and plug and socket connections 34. By this means data may be supplied to the computer and signals then may be received from the computer 32.

Figure 3:
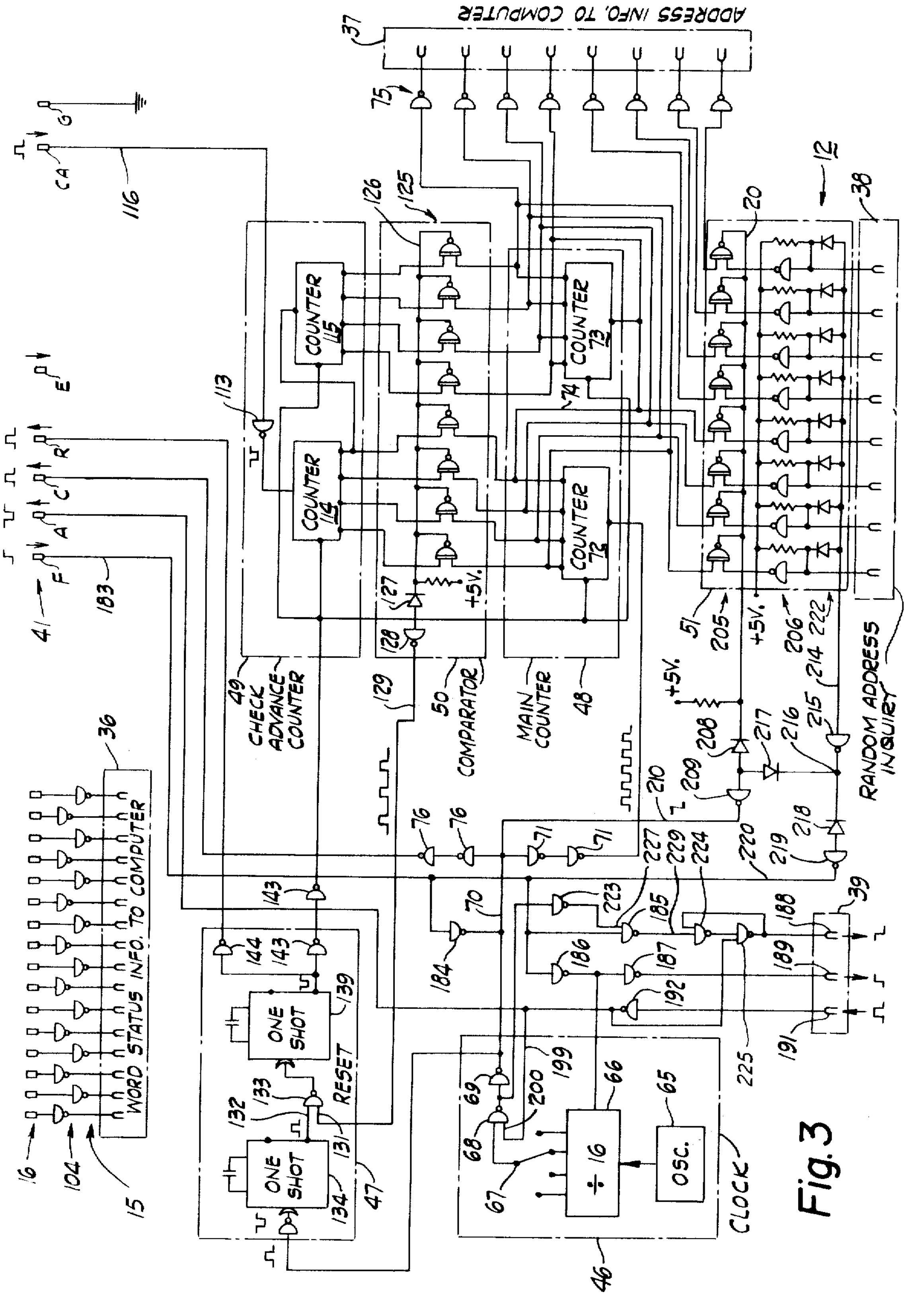
FIG. 3 is a schematic diagram of the interface transmitter.
Figure 4:
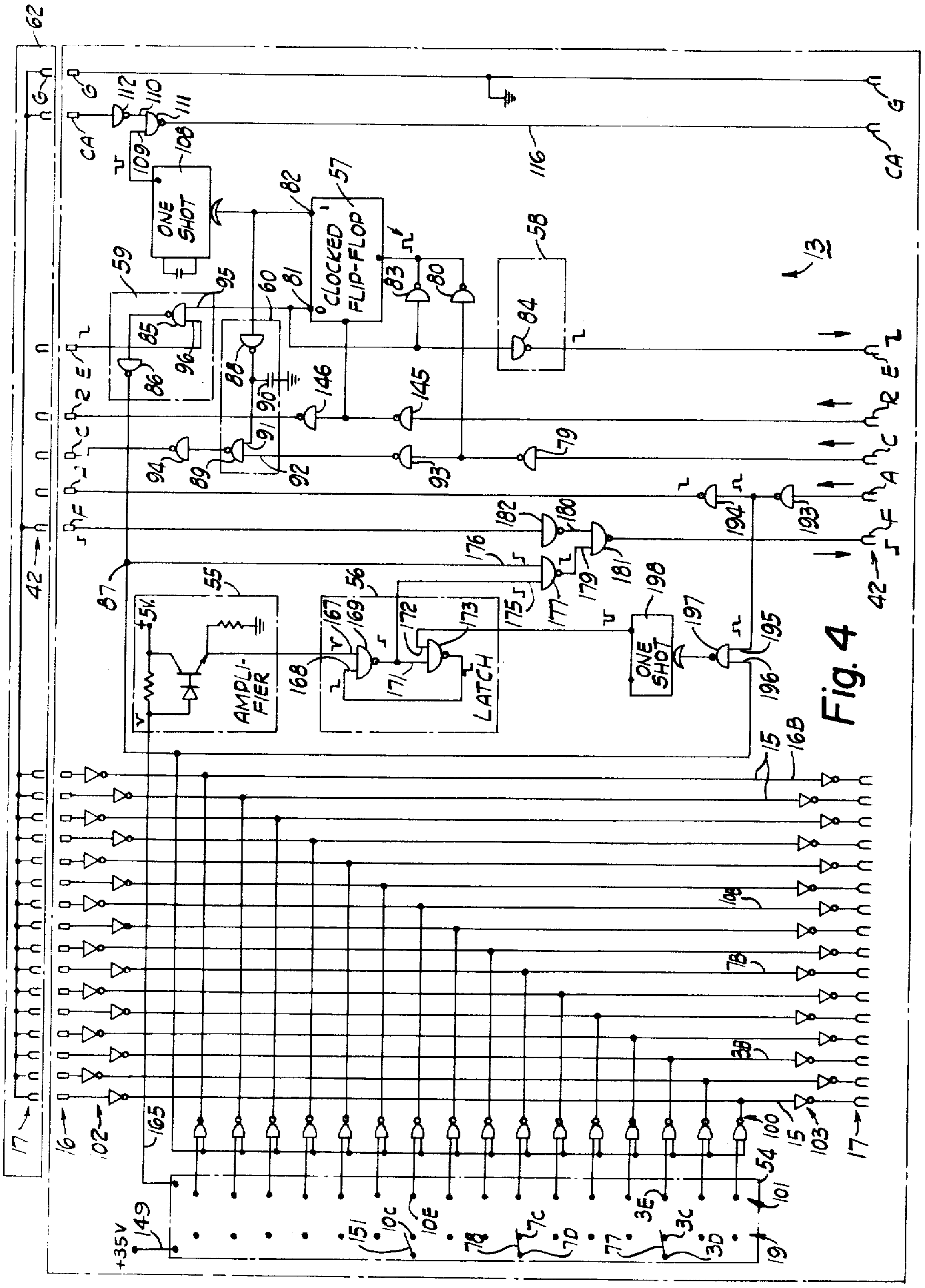
FIG. 4 is a schematic diagram of one of the transmitter extenders.

FIG. 3 illustrates schematically the circuit of the computer interface transmitter 12 and FIG. 4 is a schematic diagram of the circuit contained in one of the transmitter extenders 13. The FIGS. 3 and 4 show the first plurality of conductors 15 and in this case there are 16 such conductors in order to establish the status of a 16-bit word. This plurality of conductors 15 in extender 13 has a multiple conductor plug 16 at the upper end of FIG. 4 and has a multiple conductor socket 17 at the lower end of this FIG. 4. The socket 17 will receive the multiple conductor plug 16 on the upper end of the computer interface transmitter 12 of FIG. 3. This interconnects the plurality of conductors. A sequence of extenders such as extenders 13 may be interconnected by this plug and socket means 16 and 17 as better illustrated in FIG. 1. Individual conductors 1B through 16B make up the set of plurality of conductors 15. A multiple conductor socket 36 is provided in the interface transmitter 12 for connection by a flexible cable 33 to the computer terminal 32. This is a word status information to the computer. Additional multiple conductor sockets 37, 38 and 39 are provided in the transmitter 12 for connection to the computer terminal 32. The socket 37 is for address information to the computer, the socket 38 is for random address inquiry from the computer and socket 39 is for control signals.

A multiple conductor plug 41 on the transmitter 12 may connect with a multiple conductor socket 42 on the extender 13 for supplying control signals between these two units. Also the extender 13 has the same multiple conductor plug 41 at the opposite end thereof for connection with the next extender in the sequence. The transmitter 12 and extenders 13 may be constructed on printed circuit boards or the equivalent with the multiple conductor plugs 16 and 41 being pin connections on one end of such circuit board receivable in individual sockets 17 and on the opposite end of the next circuit board. This connection may be similar to that shown in the Extendable Multiplexer, U.S. Pat. No. 3,723,658.

The interface transmitter 12 includes generally a clock circuit 46, reset means 47, a main counter 48, a check advance counter 49, a comparator 50 and a random address input circuit 51. The transmitter extenders such as extender 13 include generally a change detector circuit 54 to which the input terminals 19 are connected, the plurality of conductors 15, an amplifier circuit 55, a latch circuit 56 and enabling means 57 which includes three sections with a first section 58 to disable the preceding extender, a second enabling section 59 to enable the respective extender and a third enabling section 60 to permit enabling the succeeding extender.

The computer interface system 11 has the extenders 13 and 14 connected in series and they are extendable without mathematical limit. One or more words is established on each extender 13 or 14, the series of extenders forming a plurality of words in a complete sentence. Each word 1A to 9A is a plurality of bits of digital data. The interface transmitter 12 includes a scanning means which is primarily the clock 46 or pulse generating means to provide a sequential scan of each of the words in the extenders 13 and 14. The words are scanned word-by-word rather than bit-by-bit and this makes possible a much more rapid scanning of the complete digital data sentence. The scanning is effected sequentially through the extenders.

An end terminator 62 is provided on the last extender and has sockets 17 and 42 which may be plugged onto the multiple conductor plugs 16 and 41 of the last extender. The enabling means 57 and comparator 50 then establishes that the sequence of scanning will be terminated and the reset circuit 47 is actuated to reset the entire transmitter assembly 12, 13 and the scan begins anew.

The scanning means includes the clock 46 which is a pulse generating means. It may include a crystal controlled oscillator 65 supplying a suitable frequency, e.g., 1 MHz, to one or more dividers 66. In FIG. 3 this is shown as a divide by 16 circuit having multiple outputs of divide by 2, 4, 8 or 16. An output terminal 67 may be connected by a multiple position switch or a connectable strap to any one of the outputs of the divider 66, for example, to have a 250 KHz output to an input of a gate 68. This gate may be an AND gate or in the preferred embodiment is a NAND gate as shown by the small circle at the output indicating that the output is inverted. Most of the gates in the preferred embodiment are NAND gates for simplicity of manufacture and servicing. The output of gate 68 goes through another NAND gate 69 to again be inverted and appear as a series of spaced pulses on a clock line 70. These clock pulses are passed through another pair of NAND gates 71 to the main counter 48. Gates such as gates 71 appear throughout the circuit in pairs and this is for isolation, buffer amplifying and so as to not load the adjacent extender in a manner to degrade its performance. By this means, many extenders may be connected in series to form a sentence of "words" of any practical length. The main counter 48 may include commercially available counters such as the Motorola MC839P. Two such counters 72 and 73 are provided in the main counter 48. Each counter 72 and 73 has a natural binary output on four output terminals which will count 2, 4, 8 and 16, respectively. The 16 terminal output is connected by a conductor 74 to the input of the counter 73 which also has four outputs counting in the natural binary scale of 32, 64, 128 and 256. All of these eight binary outputs of the main counter 48 are connected to the multiple conductor status information socket 37 via isolating gates 75. Accordingly, whatever number appears on the counter 48 will also appear on the socket 37 for transmission to the computer terminal 32.

The clock pulses from the clock 46 are that which furnish the scan of the transmitter assembly 12, 13. These clock pulses on the clock line 70 are supplied through a pair of inverting gates 76 so that they are again positive going pulses and supply to a clock pin C in the plug 41. By the connection of the plug 41 into the socket 42, this pin C is connected to a socket C on the first extender 13. What the scanning means does in the transmitter assembly is to determine whether or not there has been a change at any bit in the entire word of that extender since the last scan. If there has been a change then the scan is stopped at that particular extender which has the changed word. First, assume that there has been no change in any of the words of the sentence and also assume that there are 67 words, for example, in this particular sentence. Further it is assumed that everything is reset and ready for the scan and that all 16 lines 1B through 16B are high, that is, logic 1 condition rather than low or logic 0 condition. The only exception to the line 16 lines 1B through 16B being high are that the third and seventh lines 3B and 7B are low, merely as an example, by means of the incoming signal to the input terminals 19 being low on those lines. On FIG. 4 this is illustrated by switches 77 and 78 being closed and being connected to these respective third and seventh inputs. With no change since the last scan, the scan will go right through this first extender without stopping. This is effected in the following manner. The first clock pulse on the clock socket C of extender 13 will be passed through gates 79 and 80 to the toggling input of a clocked flip-flop 57 which is the enabling means for this extender 13. This flip-flop 57 has outputs 81 and 82 which are logic 0 and logic 1, respectively, when the flip-flop 57 is reset. The incoming clock pulse goes positive and then goes negative and at the instant of going negative, this is when the flip-flop 57 is toggled to change the state of the outputs 81 and 82 to the opposite of that shown on FIG. 4. The first action of the output 81 changing from a low to a high is to feed back through a gate 83 and the output will be a high changing to a low which permanently freezes the clocked flip-flop 57 in the toggled condition so that subsequent pulses do not change the state of this flip-flop 57.

This toggling affects each of the first, second and third sections 58, 59 and 60 of the enabling means 57. The first section 58 includes a gate 84 connected to the first output 81 which has gone from low to high hence the output of gate 84 has gone from high to low. This disables the preceding extender on a socket E mating with a pin E. Since this pin E is within the transmitter 12 rather than in an extender, it is not connected to anything since there is no extender preceding the first extender.

The second action upon toggling the enabling means 57 is that the second section 59 is actuated. This second section 59 includes a dual input gate 85 into a single input gate 86 thus inverting the signal twice so that the output appears on an enabling line 87 as a positive going pulse. This enables this respective extender 13.

The third action of the enabling means 57 is to actuate the third section 60. This third section includes a gate 88, a dual input gate 89 and a time delay capacitor 90. This capacitor 90 gives a very short time delay before the next extender in the sequence may be enabled. The third section 60 is connected to the second output 82 of the enabling means 57 which output is changed from high to low upon toggling. After passing through gate 88 it is applied to the input 91 of gate 89 as a high. This enables this particular gate 89. Any low disables a NAND gate, for example, this two input NAND gate 89, so that the output remains high despite any changes on the other input. The second input 92 of gate 89 comes from the clock line C via a gate 93 and the gate 79. With two inversions this is a positive-going clock pulse on input 92. After the third section 60 has been enabled by a high on input 91, then the next pulse on input 92 will pass through this gate 89 and through a gate 94 to the clock pin C to supply this clock pulse to the next extender in the series. The first clock pulse on the clock line C does not get past the first extender 13. The reason for this is the gate 89. At the start of the scan, the clocked flip-flop 57 is stated as being reset. Accordingly, output 82 is a high and passing through gate 88 this is a low applied to the input 91 of gate 89. This low disables the gate 89 so that the clock pulse appearing on line C and passing through gates 79 and 93, and on the input 92 of the gate 89 will not pass through this gate 89.

Reverting now to the second section 59 it will be noted that the gate 85 has an input 95 from the clocked flip-flop 57. Gate 85 also has a second input 96 from the enabling pin E which is connected to the succeeding extender. It was assumed upon starting that everything was reset, meaning this second extender was also reset. As such, the clocked flip-flop 57 therein had a low output on the output terminal 81 which was passed through the gate 84 in such second extender to appear as a high on the socket E of such second extender. Accordingly, this high was applied through pin E of the first extender 13 to appear as a high on the input 96 of gate 85. This enabled this particular gate 85 so that when the input 95 changed from a low to a high as flip-flop 57 toggled, this change of input condition on input 95 could be passed through gate 85 and gate 86 to the enabling line 87.

The enabling of the second section 59 places a high on the enabling line 87. This conductor leads to a first input each of 16 paralleled inputs of dual input NAND gates 100. This high on the first of two inputs of each of these gates enables each of such gates. This means that a low on the second input will give a high output and that a high on the second input will give a low output. Each second input of these 16 dual input gates 100 is connected to a different one of 16 output terminals 101 of the change detector circuit 54. The circuit of this change detector is described below and for the present it will suffice to state that if a particular input terminal 19, such as the third terminal thereof, is held low by switch 77 being closed to ground, then the respective third input terminal of the output terminals 101 will be high because of an internal inverting gate and this high passed through the respective one of the dual input gates 100 will appear as a low on the respective conductor such as conductor 3B. Accordingly, the status of each of the bits of the word appears on the 16 lines 1B through 16B. Inverters 102 are provided on each line between the pin of socket 16 from the succeeding extender and inverters 103 are provided on each conductor before connection to the respective socket in multiple conductor socket 17 prior to connection to the preceding extender, or in this case to the transmitter 12. Again these two inverters for each extender provide isolation and buffer amplifying so that many extenders may be connected in series without loading the power supplies, not shown. This word status information is supplied from socket 17 to plug 16 in the transmitter 12 and through inverting gates 104 therein to the word status information socket 36 which is connected to the computer terminal 32. If an input terminal 19 is high, then the respective terminal 101 is low and after passing through the gate 100, the respective conductor 1B through 16B will be a high. Under the conditions shown with switches 77 and 78 closed, then conductors 3B and 7B will be low but all the rest of the conductors 1B through 16B will be high. Thus, the status of that particular word will be able to be passed to the computer terminal 32 upon command of such computer.

The above describes the clock pulse and its action on the first extender 13. The second clock pulse will now scan the second extender in the series. There will be a second extender exactly like that shown in FIG. 4 plugged into the multiple conductor plug 16 of the first extender 13. This second clock pulse goes to the second extender on the clock line C, because gate 89 has now been enabled by a high on the input 91. This clock pulse accordingly is passed to the clocked flip-flop 57 in the second extender to toggle it, as the positive pulse goes negative. This toggling of the clocked flip-flop 57 actuates the first, second and third sections 58, 59 and 60 as outlined above. The actuation of the first section 58 in this case actually does something; namely, as the output 81 of flip-flop 57 goes from a low to a high, the enabling line socket E will go from a high to a low. This appears at the enabling pin E of the first extender, which is the preceding extender relative to the second extender. This low comes in on input 96 of gate 85 to disable the first extender so that the word status information is no longer able to be applied to the conductors 1B through 16B. The second section 59 enables the second extender 13 and the actuation of the third section 60 of the enabling means enables, after a time delay, the third extender in the series. This toggling continues on and on through the series of extenders, the third clock pulse enabling the third extender, the fourth clock pulse enabling the fourth extender and so on to establish the scan of these extenders in a sequence. It is assumed that there were 67 words in this particular digitized data sentence. Accordingly, the 67th clock pulse will scan the 67th extender.

RESET CIRCUIT

The reset circuit means will reset the transmitter assembly 12, 13 after scanning all of the words in the sentence. This reset circuit means includes the reset circuit 47 in the transmitter 12, a one-shot multivibrator 108 in the extenders 13 and also includes the check advance counter 49 and comparator 50. The 67th extender is the last in the series and accordingly it is plugged into the end terminator 62. This end terminator has a ground socket G connected to a ground pin G in the last extender. This pin G is connected through a ground line to a socket G. This internally connects all the grounds of the various extenders and transmitter 12. This grounding is applied to each of the pins 16 in the 67th extender and because of the inverters 102, this helps assure that the respective conductors 1B through 16B will normally be kept high, except as driven low by the respective input terminal 19.

As each extender 13 is enabled by the scanning clock pulse, output 82 of the clocked flip-flop 57 goes from high to low. This triggers the one-shot multivibrator 108 which has an output of a negative-going pulse applied to an input 109 of a dual input gate 111. A second input 110 of this gate 111 comes from an inverting gate 112 which is connected to a check advance pin CA which is grounded through the end terminator 62. This grounding makes the input 110 high to enable gate 111. Accordingly, the negative pulse on input 109 is passed through gate 111 to a conductor 116 as a positive-going check advance pulse and this is applied to a check advance socket CA. This is connected to a check advance pin CA in the transmitter 12 and passes through an inverting gate 113 to the check advance counter 49. This is a counterpart of the main counter 48 and also includes counters 114 and 115 which have a natural binary output on four terminals each to count up to $2^8$ or up to the numeral 256. As each extender 13 is enabled the one-shot 108 sends a narrow check advance pulse to the check advance counter 49. This check advance pulse is like an echo pulse coming back from the extender which has been enabled. The presence of such echo pulse indicates that such particular extender has been scanned and these echo pulses or check advance pulses are counted at the counter 49.

Figure 2:
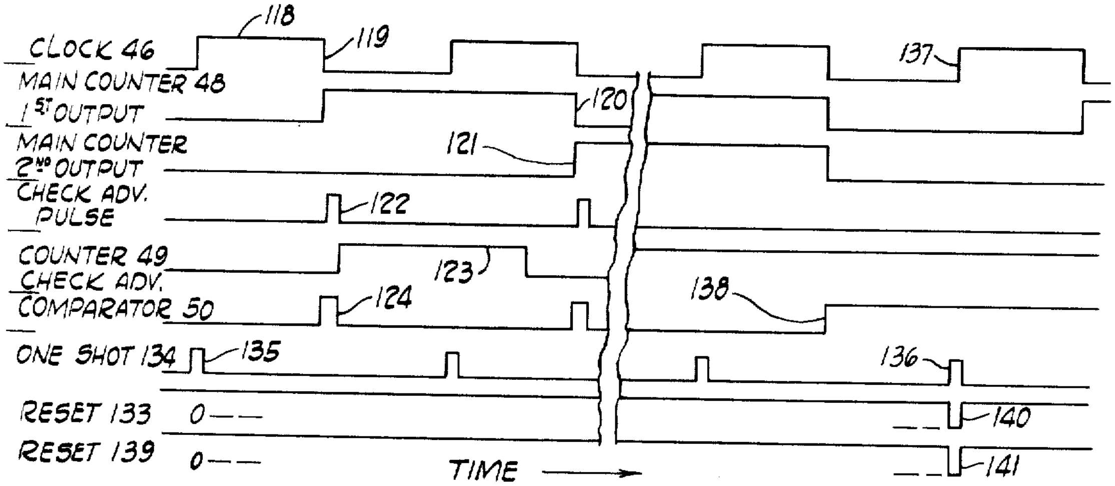
FIG. 2 is a graph of various voltage pulses within the system.

FIG. 2 illustrates the pulses at the various portions of the circuit, with the pulses 118 from the clock 46. In the preferred embodiment, these were occurring at a 1 MHz rate from the oscillator 65 and were divided in the divider 66 to appear on the clock line 70. The trailing edge 119 of each clock pulse is that which triggers the main counter 48 and in FIG. 2 a graph 120 shows the voltage appearing on the first output of counter 72. A graph 121 shows the output of the second output terminal of counter 72. On the trailing edge of the fist pulse the counter first output goes high and upon the trailing edge of the second pulse, the counter second output goes high whereas the counter 72 first output returns low. FIG. 2 shows the check advance pulses 122 which occur in real time delayed from the trailing edge of the clock pulse 119. The reason for this is the main counter 48 operates through only two gates 71 whereas the signal from which the check advance pulses are developed operates through six gates 76, 79, 80, 111 and 113 plus the clocked flip-flop 57 and one-shot multivibrator 108. FIG. 2 shows the graph 123 of the first output of the check advance counter 114 and a graph of output pulses 124 from the comparator 50. This comparator 50 is made up of a group of exclusive NOR gates 125 each of which has two inputs connected to the correspondingly numbered outputs of the main and check advance counters 48 and 49. An exclusive NOr gate is one which has a low output if the two inputs are unequal and has a high output if the two inputs are equal, whether both high or both low. Accordingly, the comparator 50 will have an output low on a conductor 126 from any one of the eight exclusive NOR gates whenever inputs to that particular gate are unequal. This low on conductor 126 causes conduction of a diode 127 driving the input to a NAND gate 128 low and hence the output on a conductor 129 will be high whenever any of the inputs to the gates 125 are unequal.

This conductor 129 is connected to an input 131 of a two-input NAND gate 133. The second input 132 of this gate is connected to the output of a one-shot multivibrator 134 which delivers a very narrow positive pulse at the beginning of the positive-going portion of the clock pulse 118. FIG. 2 shows the output pulses 135 of the one-shot multivibrator 134. In the normal scanning of each of the extenders the two pulses 124 and 135 do not coincide in real time and hence there normally is no negative going output from the gate 133. However, after all 67 extenders, in the above example, have been scanned, there is a 68th clock pulse emitted by the clock 46. The main counter 48 counts this 68th pulse and has a binary output of 68 which would be 01000100. However, there is no 68th extender and hence there is no 68th echo pulse or check advance pulse. Accordingly, the check advance counter 49 remains with a count of 67 which in binary code would be 01000011. Graphs 120 and 121 of FIG. 2 show that the main counter first and second output terminals have changed to a low state on the first and second outputs but graph 123 shows that the check advance counter 49 first output has not changed state, it remains at a high output. Accordingly, FIG. 2, graph 124 shows that the comparator 50 has an output 138 which is not merely a pulse but instead is a continuous high output. When the one-shot multivibrator 134 has its pulse output 136 coinciding with the leading edge of the 69th clock pulse 137, this will be momentarily two highs on the gate 133 to give it a low output pulse 140 to a one-shot multivibrator 139. FIG. 2 shows the negative going output pulse 140 of the reset NAND gate 133 and a negative going reset pulse 141 emitted from the one-shot 139. This is a reset pulse which resets every thing in the transmitter assembly 12, 13. It is passed by gates 143 to reset the counters 72, 73, 114 and 115. It is also passed by a gate 144 to appear as a positive going reset pulse on a reset pin R connected to a reset socket R on each extender. In the extender 13, it is passed by a gate 145 to reset the clocked flip-flop 57 and passed by a gate 146 to the next extender. With everything reset the 70th pulse goes to the first extender to start the second scan of the sequentially connected extenders.

If at any time an "echo" pulse does not get back to the check advance counter 49, or if a false pulse does somehow get back, then the counters 48 and 49 immediately get out of synchronization, there is an output from the comparator 50 and everything is reset on the next clock pulse to have the scan again start with the first extender 13.

CHANGE DETECTOR

Figure 5:
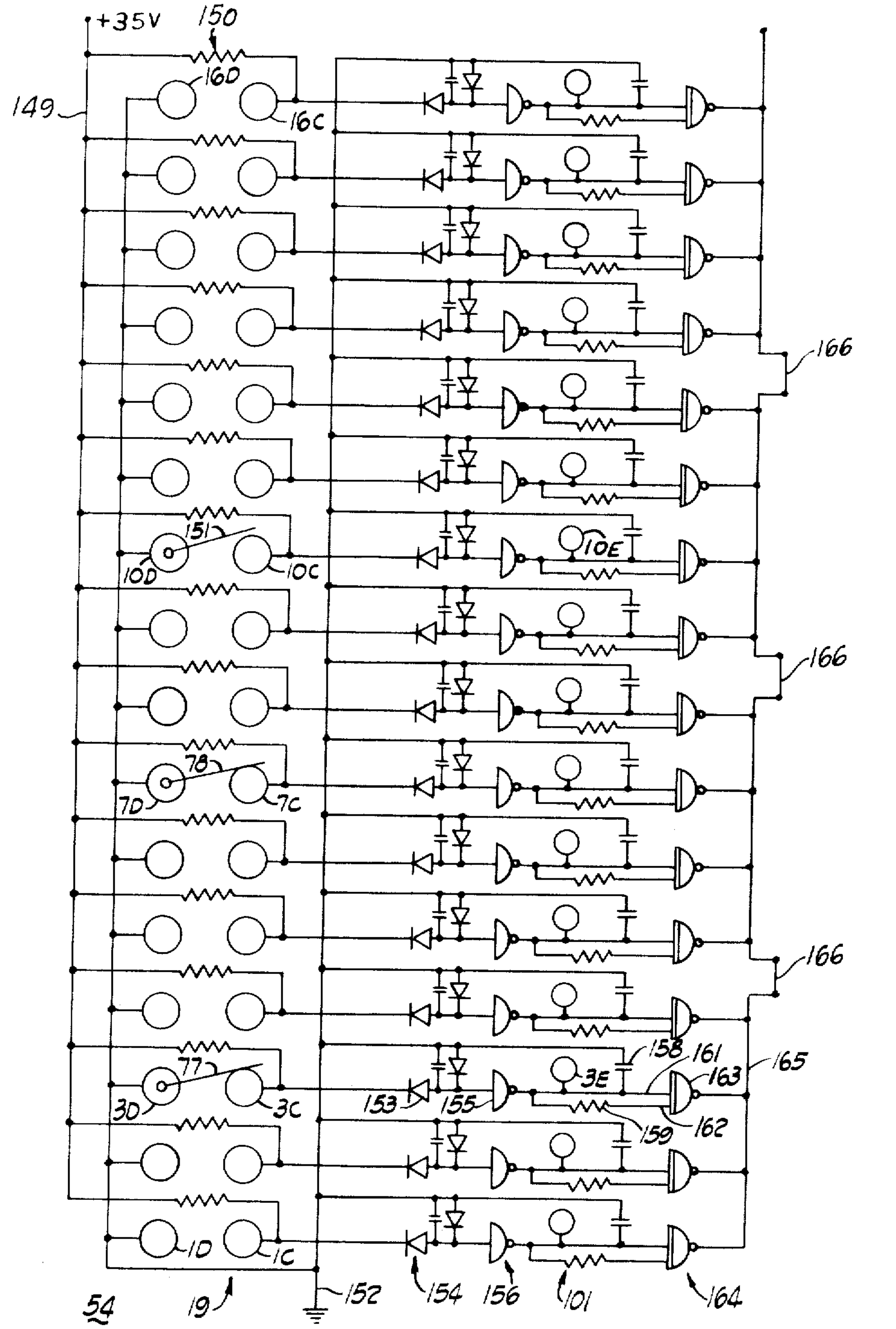
FIG. 5 is a schematic diagram of a change detector circuit as part of the transmitter extender.

Assume now that there is a change, at any time, on a particular word of the sentence. For example, let it be assumed that there is a change on the 33rd word; namely, the 33rd extender, and the input condition on the 10th input terminal 19 goes from a high to a low condition by closing of a switch 151 thereon. FIG. 5 shows a schematic diagram of the change detector 54. This FIG. 5 shows a series of 16 of the input terminals 19 which may be referred to as terminals 1C through 16C. Companion terminals 1D through 16D are each connected to ground 152. To correspond with FIG. 4, closed switch 77 is shown connected across terminals 3D and 3C, closed switch 78 is shown connected across terminals 7D and 7C and open switch 151 is shown connected across terminals 10D and 10C. This is merely for illustration and the open or closed switch will usually be in the machine under surveillance 23 or 30, of FIG. 1. A power line 149 is supplied with positive voltage, e.g. 35 volts. This feeds through a group of resistors 150 to make the terminals 1C–16C normally high. When the switch 77 is closed, as an example, this places a low condition on terminal 3C. A diode 153 of a group of 16 diodes 154 will conduct causing the input to an inverting gate 155 to go low. This gate 155 is one of a group of 16 gates 156. Inverting gate 155 thus has an output at a terminal 3E which goes from low to high, upon closing of switch 77. A time delay capacitor 158 is connected between terminal 3E and ground 152 and in conjunction with a resistor 159 gives a very short time delay before application of this change, from low to high, to a second input 162 of an exclusive NOR gate 163. The potential on the terminal 3E is applied directly to the first input 161 of this exclusive NOR gate 163. Accordingly, for a short time, there is an unequal input on the two inputs of this gate to give a short negative-going pulse on the output conductor 165 upon any change on the input terminals 19. Also if a switch 77 were to be opened this would make terminal 3C suddenly high, driving terminal 3E from high to low. This would put a low voltage on input 161 followed a short time later by a low voltage on the second input 162 of gate 163. For this short time delay there would be unequal inputs on the exclusive NOR gate 163 for a short negative going pulse on the conductor 165. The above shows that whether the change is from low to high or high to low, the exclusive NOR gates 163 of the group of gates 164 will deliver a negative-going pulse on conductor 165.

In the above example, it was assumed that there was a change in the 33rd word or extender by the closing of the switch 151 on the 10th input terminal 10C of the group of input terminals 19. This change may occur at any time.

As the 33rd extender is scanned by a clock pulse applied to the enabling means 57 therein, the description above shows that the enabling line 87 goes high to enable that particular 33rd extender. As stated above, this enables the group of NAND gates 100. Accordingly, the change from high to low on terminal 10C means a change from low to high on terminal 10E and hence a change from high to low on the output of the respective NAND gate 100. This puts a low condition on conductor 10B, so that the word status is available to the computer. Conductor 165 is shown as including three jumpers 166. If the center jumper is removed, this will break the change detector into two eight-bit words. If all jumpers are removed, this will break the change detector into four four-bit words. This is the circuit in extender 14, shown in FIG. 1. The remaining circuit of the extender shown in FIG. 4 is then quadrupled to permit it to have an enabling means 57 and to develop a freeze pulse for each word.

Also, during the time that the 33rd extender is being scanned, the conductor 165 has a short negative-going pulse thereon. FIG. 4 shows that this conductor 165 goes to an amplifier circuit 55 to amplify the power output from the change detector 54. It passes from the amplifier circuit 55 to the latch circuit 56, again as a negative going pulse on a first input 167 of a two-input NAND gate 169. This output goes high and is fed to a first input 171 of a NAND gate 173. The output thereof is driven low which feeds back into a second input 168 of gate 169 thereby latching this gate output in a high condition. This high condition is passed to one input 175 of a NAND gate 177, out the output thereof as a low to an input 179 of a gate 181. Gate 177 has an output of a low condition only when both input 175 and an input 176 are high. Input 175 has a high input when the latch circuit 56 has latched, indicating a change on any of the 16 bits of that particular word. Input 176 has a high condition only when that particular extender is up for examination, which means that conductor 87 will have a high condition. The coincidence of these two highs means that gate 177 has a low output applied on input 179 and hence gate 181 changes from a low to a high output. Gate 181 has a second input 180 which is normally high and hence with two normally high inputs 179 and 180, gate 181 has a normally low output. Hence the change from high to low on input 179 makes the output go from low to high on a freeze socket F. Tracking back, this normally low output on the freeze socket F of a particular extender will be applied to the freeze pin F on the preceding extender, and this applied through an inverting gate 182 makes the normally high condition on input 180.

This freeze pulse, going from low to high, is applied to the transmitter 12 on a freeze pin F and hence to a freeze line 183. The freeze line passes to an inverting gate 184, the output of which is connected to the clock line 70 to hold this line low. It will be recalled that a particular extender is not enabled until the positive clock pulse is going negative back to a low condition. Accordingly, the clock line 70 is normally low at the instant that a particular extender is enabled, and if a change has occurred on a particular word or extender, then this freeze pulse coming in on the freeze line 183 merely holds the clock line 70 low, rather than driving it low. The clock is still running and producing pulses appearing at the input to the gate 69, however, they do not get beyond the clock line 70, which is now held low by gate 184.

The positive going freeze pulse is passed by a gate 185 to an interrupt display socket 188 in the multiple conductor socket 39. This connects the control signals to the computer terminal 32. Also the complement of this signal is applied through gates 186 and 187 to an interrupt complement socket 189 in the multiple conductor socket 39. Some computers may be wired to use a positive-going signal rather than a negative going signal, and hence would use the signal on socket 189.

The interrupt display signal remains on the socket 188 until the computer is ready to receive this signal. This assures that the computer interface system 11 does not control the computer rather the computer is in command of the interface system 11. The reason for this is that the computer may be a large multi-purpose computer which is operating on many different problems, spending a fraction of a second in sequence on each of the different problems presented on each of its computer terminals. This is to save time on the computer and hence to save money. From the foregoing it will be seen that the change detector 19 detects a change which occurs at any time on any of the plural bits of a single word. Upon detecting such change, the latch circuit 56 is actuated and an interrupt signal appears at the input 175 of the dual input gate 177. This enables this gate 177 so that the next time this particular extender; namely, this particular word, is scanned by the scanning means, enabling line 87 is enabled and a freeze signal is produced on the socket F. This produces the signal on the freeze line 183 and the signal on the interrupt display socket 188. The latch formed by gates 224 and 225 is set at a conductor 229 when a conductor 227 and freeze line 183 are high. Since conductor 227 is clocked high through a gate 223 one-half Hz. later than the freeze line, the signal on the interrupt display socket 188 is delayed by ½ Hz. This permits data to settle before commanding the computer to read.

When the computer is ready to work on the particular problems presented by this particular computer terminal 32, then the computer will note, by the low condition on the interrupt display socket 188, that there has been a change in a word. The computer then notes the address of the word obtained from the address information socket 37. In the above example, this would be the 33rd word which has been changed and hence a binary numberal equivalent to the decimal number 33 will be present on this socket 37. Because of the inverting gates 75, the binary numeral of socket 37 would be 11011110, the complement of 00100001. The computer also reads the word status information present on socket 36 and this will be, in the above example, a change from high to low on the tenth conductor 10B. The computer will store this changed word condition in its memory according to the proper word address. After reading and storing this change, the computer sends a positive going acknowledge pulse on a socket 191 in the control signal socket 39. This positive going pulse is changed by inverting gate 192 to a low condition which appears as a low on the acknowledge pin A in the transmitter. Here it is passed to the first extender on socket A. It does nothing in the first extender, because the first extender was not frozen. It passes through gates 193 and 194 to again appear as a negative-going acknowledge pulse at pin A of the first extender. It passes through the first 32 extenders in this manner until it reaches the 33rd extender. Here it passes through gate 193 to appear as a positive-going pulse on an input 195 of a gate 197. The second input 196 of this gate is high in this one extender along because it is connected to the enabling line 87 which has been frozen high. These two highs on the inputs of gate 197 give a low output which is passed to a one-shot multivibrator 198 which has a short negative pulse output applied to an input 172 of gate 173. This low input causes gate 173 to have a high output which is fed back to input 168 of gate 169 so that it has a low output. This unlatches this latch circuit and readies it for the next scan. Also the low output on gate 169 is passed to input 175 of gate 177 for a high output of gate 177 and a low output of gate 181. This eliminates the freeze pulse so that the scan may continue.

The acknowledge pulse coming from the computer terminal 32 and appearing on the acknowledge socket 191 has a second function. It is applied through gate 192 to a conductor 199 and appears on an input 200 of gate 68 in the clock 46. This is a low input and hence disables the gate 68. This holds the clock line 70 low from a second source. The clock line 70 is already disabled because of gate 184 but this disabling by means of conductor 199 and gate 68 is just to make sure that several extenders are not acknowledged in sequence with a long acknowledge pulse. The scan starts after the last to occur of either the end of the acknowledge pulse or the end of the freeze.

The end terminator 62 is connected to the extreme end of the series connected extenders 13,14 regardless of how many extenders are employed. Alternatively, the extender may be one of the four word input extenders 14 with the circuitry within this terminator performing several functions including,

*a.* requiring the scanner to scan through four words, and these are always the last four words in the complete system sentence;

*b.* A single data point is internally connected in the third word within the terminator so that one remaining word follows it and two words precede it;

*c.* A $2^{16}$ counter, similar to counter 48, is connected to the third word so that a single piece of data changes state each $2^{16}$ scans.

This generates an interrupt which the computer connected to the system must clear at regular intervals of $2^{16}$ scans. This feature can be made optional by means of external jumpers and can be included in the system software program as part of overall system diagnostics.

It is necessary for the terminator to include at leat one redundant word and it is convenient to include four redundant words.

The random address input circuit 51 is to permit a particular binary number to be inserted into the transmitter 12, 13 so that the computer or a person may determine the status of a particular word. As an example, let it be assumed that it is desired to know the status of the seventh word in the sentence. The decimal numeral 7 is equivalent to the binary numeral 00000111. When the complement of this binary numeral because of inverting gates 206 is inserted into the random address inquiry socket 38, then the main counter 48 will stop at this same numeral 7 in its scan. This is accomplished in a manner similar to action of the two counters 48, 49 and the comparator 50.

A series of eight exclusive NOR gates 205 are dual input gates each having one input connected to an output of the main counter 48. The other input of the gates 205 passes through one of the group of inverting gates 206 to a respective connector in the socket 38. The complement of the desired binary numeral is applied on socket 38, in this example, the applied voltages would be 11111000. This means that the first three of the eight gates 205 will have a high input on one of the two input terminals. Accordingly, when the main counter counts up to a decimal of 7 or a binary 111, then all the gates 205 will have equal inputs. These are exclusive NOR gates and accordingly, the outputs all connected to a condutor 207, will go to a high when all of these inputs are equal. This change from low to high means that a diode 208 will no longer conduct and hence the input on a gate 209 will go high making the output 210 go low. This is connected to the clock line 70 which holds this low and hence stops the scan. The status of the seventh word is at that time applied on the conductors 1B–16B by the respective extender and accordingly the word status may be obtained from the word status information socket 36.

During normal scan of the series of extenders 13, the random address inquiry would not be calling for the address of a word. Accordingly, the word zero is applied on the random address input circuit 51. Because of the inverting gates 206, this means that actually a high is placed on each of the individual connectors in the socket 38. When these are all high, then all the outputs of gates 206 are low for word zero. A line 214 is high on word zero. Passing through a gate 215, this makes a low at a connection 216 and hence a diode 217 is conducting on word zero. Also a diode 218 is conducting on word zero for a low on the input of a gate 219 and a high on a line 220. This line 220 is connected to the freeze line 183. The aforementioned conditions are reversed when any word is being commanded. In the aforementioned example, word 7 was being commanded. Instead of all highs on the socket 38, this makes three lows on the individual connectors thereof. Any low out of the eight makes the respective one of a group of diodes 222 conduct pulling line 214 low, connection 216 goes high and the freeze line 220 goes low. This blocks a freeze on the automatic scan so that the word status on the lines 1B–16B will be the word desired by the random address inquiry, the seventh word in the above example.

The present disclosure includes that contained in the appended claims, as well as that of the foregoing description. Although this invention has been described in its preferred form with a certain degree of particularlity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A digital data interface system, comprising in combination, a transmitter assembly having a plurality of signalling points arranged in groups with each group establishing a word of a sentence, input means to apply digits to said signalling points of said transmitter assembly with each digit being one of at least two states, scanning means in said transmitter assembly, means connecting said scanning means to scan the words in sequence in said transmitter assembly, change detector means in said transmitter assembly connected to said input means to detect a change in the state of a digit of a word, a first plurality of conductors, means connecting said plurality of conductors in parallel to said transmitter assembly, and word status information means connected to establish information as to the changed state of the digit of the word on said paralleled conductors.

2. An interface system as set forth in claim 1, including means in said scanning means to halt the scan of a changed word upon determining that the word has changed since the last scan.

3. An interface system as set forth in claim 2, including means to develop an interrupt signal upon the halting of said scanning means, and acknowledge signal means to establish restarting of said scanning means.

4. An interface system as set forth in claim 1, including plural bit addressing information means to establish information as to the position of the word in the sentence.

5. An interface system as set forth in claim 1, wherein said transmitter assembly includes an interface transmitter, at least one interface transmitter extender, and said input applying to each interface transmitter extender at least one digitized word of a sentence.

6. An interface system as set forth in claim 1, wherein said word status information means is connected to establish information as to the state of the digits of each word on said paralleled conductors.

7. An interface system as set forth in claim 1, including enabling means connected to said at least one transmitter extender, means in said scanning means to determine that the scanned word has remained the same since the last scan, and means in said scanning means to actuate said enabling means to move the scan sequence to the next word upon determining that the scanned word has remained the same since the last scan.

8. An interface system as set forth in claim 7, including gate means in said scanning means to halt the scan at a changed word by not actuating said enabling means.

9. A digital data interface system, comprising in combination, a transmitter assembly, a plurality of interface transmitter extenders in said transmitter assembly, word input means to apply to each interface transmitter extender one or more plural bit digitized words of a sentence, scanning means in said transmitter assembly, and means connecting said scanning means to scan said transmitter extenders in sequence to determine simultaneously the status of the plural bits in a single word, each bit having one of at least two states.

10. An interface system as set forth in claim 9, including a computer interface transmitter in said transmitter assembly, and wherein said scanning means is connected in said transmitter.

11. An interface system as set forth in claim 9, including a first plurality of conductors connected in parallel to each of said transmitter extenders, and means to establish the status of the plural bits of each word on said plurality of conductors.

12. An interface system as set forth in claim 9, including a pulse generator developing pulses in said scanning means, and means connecting said pulse generator to apply pulses to said extenders in sequence to scan the status of the words in said extenders.

13. An interface system as set forth in claim 9, including enabling means in said transmitter assembly, and means connecting said scanning means to scan said transmitter extenders in sequence determined by said enabling means enabling a respective extender.

14. An interface system as set forth in claim 9, including a first plurality of conductors connected in parallel to each of said transmitter extenders, and wherein said scanning means connection means emits an interrupt signal upon the occurrence of a change in any of said bits and also to establish the status of said plural bit word on said plurality of paralleled conductors.

15. An interface system as set forth in claim 9, including a plural bit change detector in said transmitter assembly connected to detect a change in any part of said data on the input to said change detector, and means in said change detector to emit an interrupt signal upon detection of a change.

16. An interface system as set forth in claim 15, wherein said change detector includes plural comparators connected to detect a change in any of said incoming data bits to emit said interrupt signal.

* * * * *